United States Patent Office 3,349,216
Patented Oct. 24, 1967

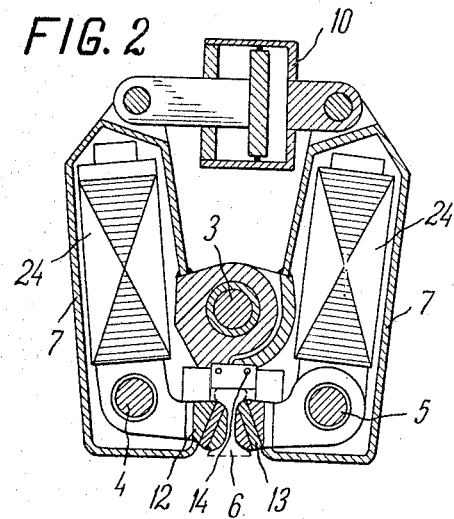
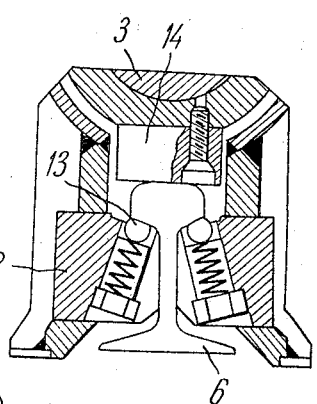
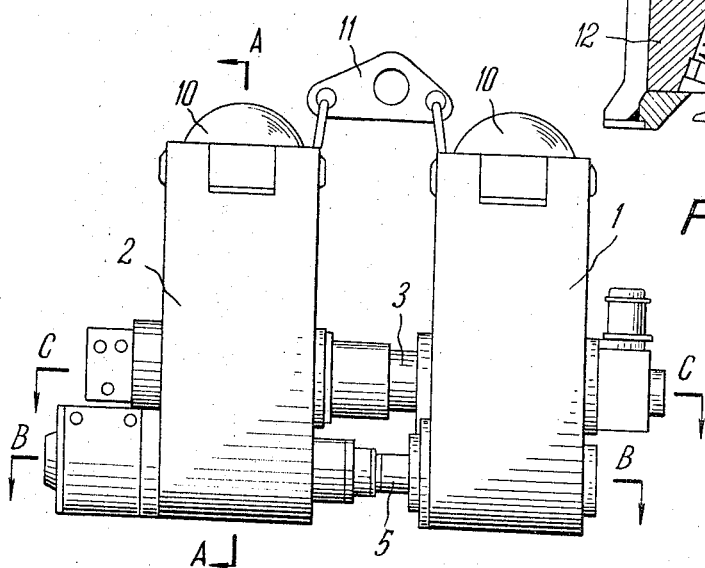

3,349,216
MACHINE FOR RESISTANCE BUTT-WELDING
Boris Evgenjevich Paton, Vasily Alexeevich Sakharnov, Vladimir Konstantinovich Lebedev, and Sergei Ivanovich Kuchuk-Jatsenko, Kiev, U.S.S.R., assignors to Institute electrosvarki im.E.O. Patona, Kiev, U.S.S.R.
Filed June 4, 1964, Ser. No. 372,643
4 Claims. (Cl. 219—101)

ABSTRACT OF THE DISCLOSURE

A butt welding machine with two clampers each including casings on which are mounted current carrying clamping jaws, one of the clampers being rotatable about a rod. A sleeve is mounted on the rod and the other clamper is rotatable on the sleeve which is axially displaceable along the rod. Hydraulic cylinders are mounted on one of the clampers to provide the upsetting force, said cylinders having rods symmetrical to the workpiece by which the clampers are relatively displaceable towards each other. The clampers are operated by another hydraulic cylinder.

---

Figure 3:
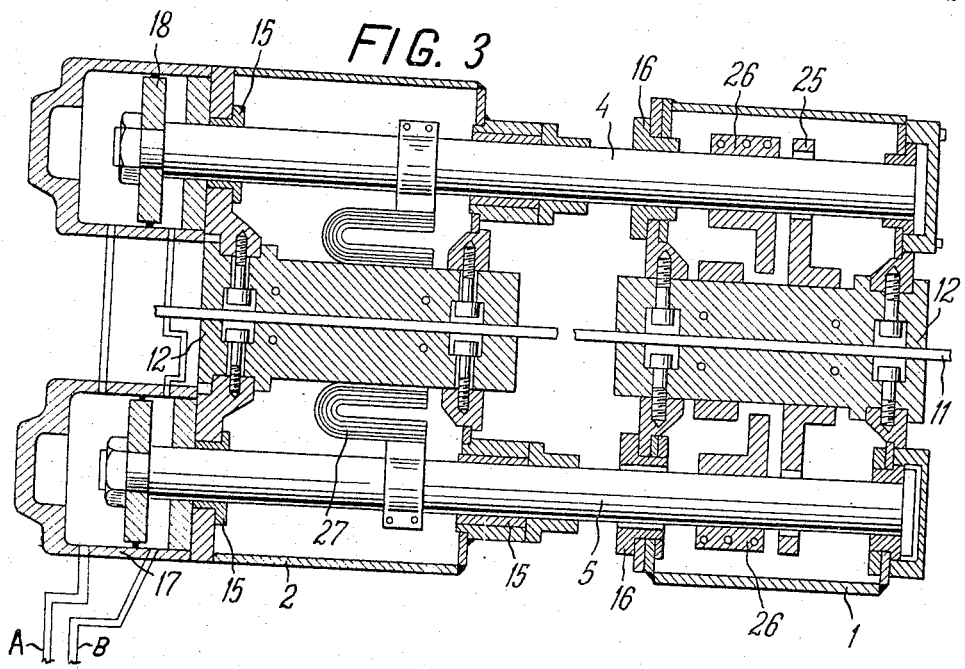

This invention relates to machines intended for resistance butt-welding of rails, section steel and the like.

Prior to the invention there were known various resistance butt-welding machines comprising two clampers for setting and fastening the workpieces to be welded, two welding transformers with current-carrying clamping jaws, and hydraulic drives for clamping and displacing of the workpieces during flashing and upsetting processes.

However certain disadvantages are inherent in these known constructions of resistance butt-welding machines. These disadvantages include the heavy weights and large overall dimensions prevalent in the known constructions, the high power required for the welding transformers, the substantial electrical energy consumption, the insufficient reliability of the machine in operation, and the inadequate stability of the process of continuous flashing welding.

It is an object of this invention to provided an improved design for a resistance butt-welding machine of a light weight and small overall dimensions.

It is another object of this invention to reduce the voltage required for said welding transformers and to reduce the electrical energy consumption.

It is a further object of this invention to improve the stability of a continuous flash welding process especially for welding workpieces with compact cross-sections, e.g. rails.

It is still another object of this invention to provide a high reliability of operation for resistance butt-welding machines.

To achieve the above and other of its objectives, there is contemplated in accordance with the invention the provision of a resistance butt-welding machine comprising two clampers, each including two casings. Welding transformers are mounted in the casings of one of the clampers. Current-carrying clamping jaws are mounted on the casings and a central rod serving, with a workpiece to be welded and which is clamped, as an axis for the turning of one of the clampers, the one clamper being mounted on one of the end portions of the central rod. A sleeve is provided which is mounted on the other end portion of the central rod, adapted for axial displacement and serving as an axis for the turning of the other said clamper, wtih the workpiece. Two hydraulic cylinders are mounted on one of the clampers and create upsetting forces. Two rods are located in the hydraulic cylinders located symmetrically with respect to workpieces to be welded and transmitting the upsetting force to the workpieces. The two rods pass through the casings of the clampers and perform together therewith and said hydraulic cylinders turning with respect to the central rod in the direction of the force clamping the workpieces to be welded until the latter are completely clamped. A slide valve follower is used to control the hydraulic cylinders and is mounted on one end portion of the central rod. Finally an electromechanical drive of said slide valve follower is mounted on the above-noted sleeve.

Figure 4:
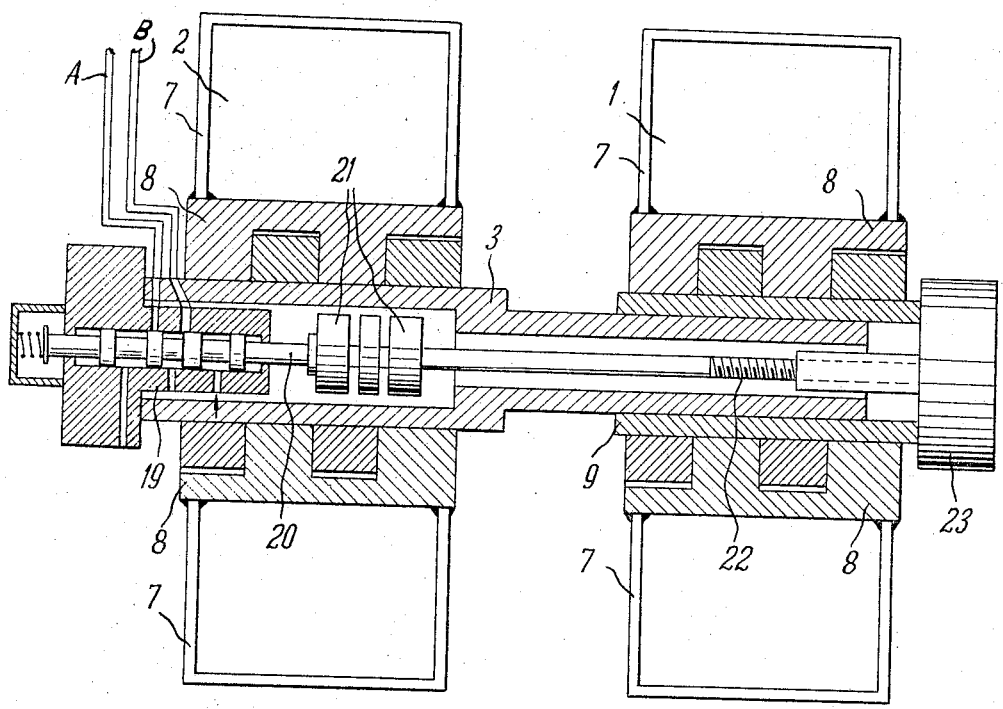

Other objects and advantages of the invention will be understood from the following detailed description of the invention and the accompanying drawings in which:

FIG. 1 is a front view of a resistance butt-welding machine provided in accordance with the invention;
FIG. 2 is a cross-sectional view of the resistance butt-welding machine taken along line A—A (FIG. 1);
FIG. 2a illustrates a detail from FIG. 2 on enlarged scale;
FIG. 3 is a cross-sectional view of the resistance butt-welding machine along line B—B of FIG. 1; and
FIG. 4 is a cross-sectional view along line C—C (FIG. 1).

The machine illustrated in the drawing is provided with two clampers 1 and 2 joined to each other by means of central rod 3 and two other rods 4 and 5 symmetrically arranged with respect to and in the same planes as the workpiece 6 to be welded. Each of said clampers consists of two box-shaped levers 7 with locks 8 wherein said levers are interjoined. The levers of the clamper 2 are interjoined in lock 8 (FIG. 4) by means of central rod 3 on which the levers are rotatably mounted. The levers of the clamper 1 are interconnected in lock 8 by means of sleeve 9 (FIG. 4) mounted on the central rod 3 and capable of axial displacement on said rod. Levers 7 of clampers 1 and 2 are actuated by means of hydrocylinders 10 (FIG. 1).

A shackle 11 is provided (FIGS. 1, 3) to suspend the resistance butt-welding machine on an elevator.

To secure workpieces 6 in the clampers 1 and 2, special current-carrying clamping jaws 12 are provided on levers 7. Spring-loaded pushers 13 are mounted in the clamping jaws and as soon as the workpiece (a piece of rail for the particular case illustrated) is fastened it is pressed against the change adjusting stops 14 providing in turn the necessary workpiece alignment.

Levers 7 of clampers 1 and 2 are interjoined by means of rods 4 and 5 and are capable of axial displacement inside bushings 15 of the clamper 2 whereas displacement of said levers inside bushing 16 of clamper 1 is limited. Rod 5 is connected to the lever of clamper 1 by means of a floating member.

Displacement of clampers 1 and 2 with respect to each other is obtained by means of hydrocylinders 17 whose pistons 18 are mounted on rods 4 and 5. Liquid is fed into the hydrocylinders 17 serving to displace the clampers 1 and 2 by means of slide valve 19 whose body is in the inner space of central rod 3 whereas slide valve rod 20 is connected through electromagnets 21 to screw 22 of electromechanical drive 23 fixed on sleeve 9 (FIG. 4).

Two armoured welding transformers 24 (FIG. 2) the secondary windings of which are provided with terminals 25 and 26 (FIG. 3) are mounted in the levers of clamper 1.

Terminals 25 are connected right to the current-carrying jaws 12 of clamper 1 whereas terminals 26 have a connection with jaws 12 of clamper 2 through rods 4 and 5 and a flexible U-shaped joint as well. On the section where rods 4 and 5 function as current-carrying elements, said rods are bimetallic in the shape of a steel core with a bronze sleeve. Arrangement of the current-carrying elements close to the workpiece to be welded as well as on the common plane decreases the short-circuit impedance of the welding machine.

The resistance butt-welding machine also comprises a hydraulic pump with an electric drive and an oil tank and also a cabinet with electrical control equipment (not shown in the drawing).

The mode of action of the resistance butt-welding machine in accordance with the invention is as follows:

The elevator-suspended welding machine with the jaws 12 spaced apart lands with its stops 14 on the workpiece 6 to be welded after which hydrocylinders 10 are engaged and the jaws are brought together to clamp the workpiece. Thereafter the welding transformers 24 are switched on and voltage is passed through jaws 12 and then hydrocylinders 17 are actuated bringing clampers 1 and 2 together with the workpieces 6 clamped. As soon as the opposite faces of the workpiece contact, welding current appears and flashing proceeds ending in upsetting. The position of clampers and the work with respect each other and the speed of their relative displacement are determined by a slide valve 19 mounted in the inner space of central rod 3 which also controls liquid supply via lines A and B into hydrocylinders 17. Slide valve rod 20 is capable of axial displacement due to electromechanical drive 23 fixed on sleeve 9. The screw 22 of the electromechanical drive 23 is connected to rod 20 of slide valve 19 through electromagnets 21. As soon as upsetting takes place, said electromagnets operate and displace rod 20 of slide valve 19 to make the liquid flow into the hydrocylinders 17. During flashing and upsetting, the rate of displacement of both screw 22 and slide valve rod 20 connected therewith is prescribed by a special timer.

The suggested resistance butt-welding machine has light weight and small overall dimensions, requires little electric power when welding workpieces with large cross-sections, consumes little current energy and is highly efficient.

What we claim is:

1. A resistance butt-welding machine comprising two clampers, each clamper including two casings; welding transformers mounted in the said casings of one of the clampers; current-carrying clamping jaws mounted on said casings of the clampers; a central rod serving, with a workpiece to be welded and being clamped, as an axis for the turning of one of said clampers, said one clamper being mounted on one of the end portions of said central rod; a sleeve mounted on the other end portion of said central rod adapted for axial displacement and serving as an axis for the turning of the other said clamper, with said workpiece; two hydraulic cylinders mounted on one of the said clampers and creating upsetting force; two rods in the said hydraulic cylinders, located symmetrically with respect to workpieces to be welded and transmitting the upsetting force to said workpieces, said two rods passing through the said casings of the clampers and performing together therewith and said hydraulic cylinders turning with respect to said central rod in the direction of the force clamping the workpieces to be welded, until the latter are completely clamped; a slide valve follower used to control said hydraulic cylinders and mounted on one end portion of said central rod; and an electromechanical drive of said slide valve follower, mounted on said sleeve.

2. A machine as claimed in claim 1, wherein a gap is provided between one of the said rods of the hydraulic cylinder and the casing of one of the said clampers, said gap providing for displacement of the said casing in relation to the said rod and in the direction of the clamping force, when clamping workpieces of various thicknesses.

3. A machine as claimed in claim 1, wherein the said rods of the hydraulic cylinders serve as current-carrying bars connecting said current-carrying clamping jaws to said welding transformers.

4. A machine as claimed in claim 1, wherein the said casings of the clampers include adjusting stops mounted thereon to obtain precise centering of workpieces of the rail type to be welded, whereas the said current-carrying clamping jaws include spring-loaded pushers pressing the heads of rails to be welded against said adjusting stops.

References Cited

UNITED STATES PATENTS

| | | |
|---|---|---|
| 671,084 | 4/1901 | Kleinschmidt et al. |
| 1,433,600 | 10/1922 | Brown et al. _____ 219—101 X |
| 2,212,393 | 8/1940 | Dalton. |
| 2,761,952 | 9/1956 | Totten _____ 219—101 |

FOREIGN PATENTS

| | | |
|---|---|---|
| 749,361 | 5/1933 | France. |
| 129,758 | 1960 | U.S.S.R. |

RICHARD M. WOOD, *Primary Examiner.*

B. A. STEIN, *Assistant Examiner.*